April 7, 1953  S. OUAIDA  2,634,120
FLOAT BALANCE
Filed Sept. 7, 1946
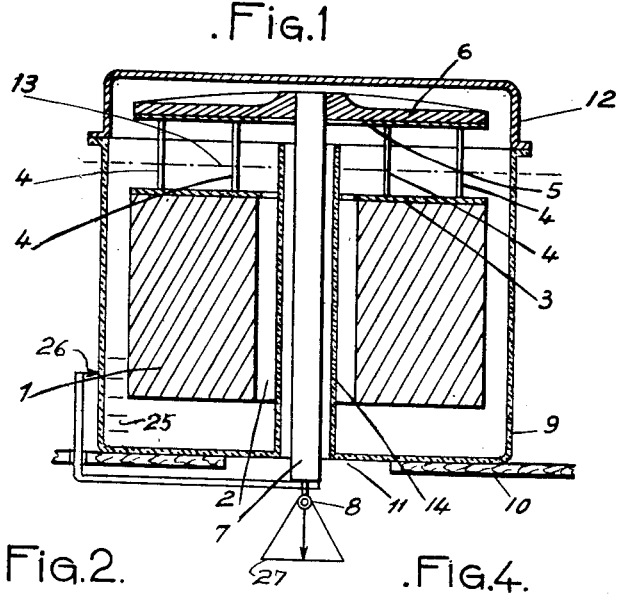
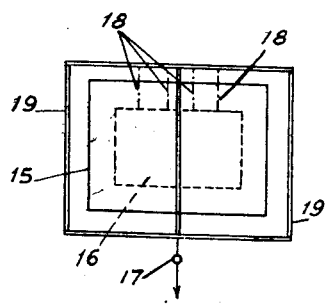
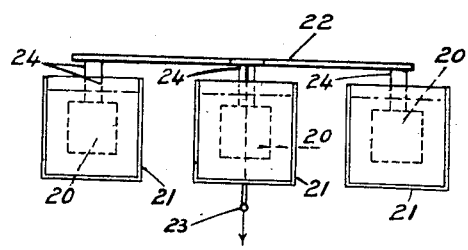
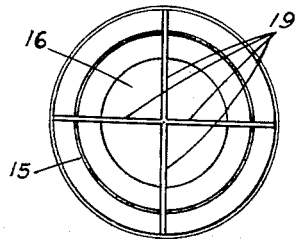
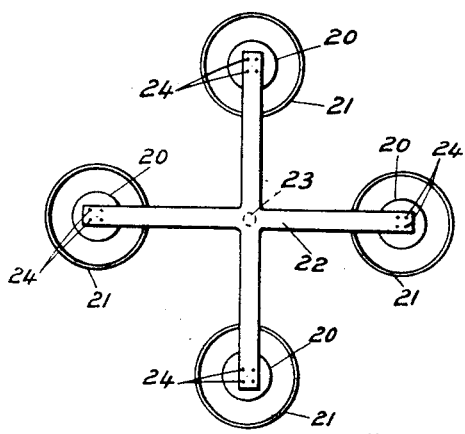
Inventor
SADALLAH OUAIDA
By Haseltine, Lake & Co.
Attorneys Patented Apr. 7, 1953

2,634,120

UNITED STATES PATENT OFFICE 2,634,120

FLOAT BALANCE

Sadallah Ouaida, Tripoli, Lebanon

Application September 7, 1946, Serial No. 695,410
In France March 28, 1946

4 Claims. (Cl. 265—43)

The present invention has for its object to provide an improved float balance adapted for various uses such in particular as the measuring or comparison of weights, specific gravities, forces and temperatures.

Its object or commercial purpose is to provide a rugged and accurate device of reduced cost and dimensions, adapted to be built either for laboratory measurements or for commercial requirements.

The balance according to this invention applies the Archimedean principle in the same way as hydrometers, densimetric balances and other similar devices, but it is primarily characterized in that it is constituted by a single float immersed in a tank and made rigid with the body to be weighed in such a manner that the centre of gravity of the whole assembly sustained by the fluid is located below the centre of pressure.

As regards the various forms of embodiment of the invention, the invention further comprises in particular the following features applicable severally and in all combinations.

a. The float is completely immersed in the liquid by which it is sustained, even when the balance is inoperative, in order to ensure the accuracy of the readings.

b. The tight container housing the float is provided with a cover which prevents, on one hand, the penetration of foreign materials in to the balance and, on the other hand, the spilling of the liquid contained therein; said cover further serves the function of a stop for positively limiting the upward travel of the float.

c. The pan or plate which receives the body to be weighed is disposed on the vertical axis passing through the centre of gravity of the balance and is connected to the float either through the medium of a rod extending centrally through the whole structure or by an armature in exterior and co-axial relationship with said structure.

d. The connecting elements of the rod or the armature as in the preceding paragraph with the float are such as to offer a very reduced cross-section so as to produce a considerable amount of penetration of said float under the effect of a small excess load on the pan of the balance.

e. The balance is supported by a tripod provided with levelling means for said balance.

f. The graduations which permit of determining the weight of any body by their registry with an index may be provided either on a fixed part or a movable part of the balance, said index then being either movable or fixed.

Further advantageous features of the invention will be disclosed in the following description made in reference to the accompanying drawings given by way of example only and wherein:

Fig. 1 is an elevational view in section on the vertical axis of symmetry, of a first form of embodiment of the invention.

Fig. 2 is likewise an elevational view, at a smaller scale, than Fig. 1, of a second form of embodiment.

Fig. 3 is a plan view corresponding to Fig. 2.

Figs. 4 and 5 respectively are views similar to Figs. 2 and 3, of a third form of embodiment of the invention.

As shown in the drawings and in particular Fig. 1, which appears to be the most advantageous arrangement both from the standpoint of constructional facility and that of stability and accuracy, the float 1 is constituted by a cylinder made either of buoyant material such as cork, or of a light metal or alloy or some suitable plastic material; in the latter case, the float 1 is made recessed or hollow in order to reduce its weight. Moreover, it is provided with a central bore 2, and its upper terminal face is rigidly connected to a rigid disk 3 whereon are secured, in any suitable way, vertical pins 4, eight in number for example, and regularly spaced along a circumference co-axial with said float.

The upper ends of said pins 4 are likewise rigidly secured to a disk 5, similar to disk 3, and in turn secured to a plate 6 provided in its centre with a vertical depending shaft 7 extending towards the lower end of the float and co-axial therewith.

The lower end of said shaft terminates in a hook 8 providing for the suspension of a balance pan 27 by means of threads or the like in a manner known per se.

The above described assembly is contained in a cylindrical housing or container 9 supported either upon a table 10 provided with an opening 11 for enabling the vertical displacements of the shaft 7, or on a tripod provided with micrometer screws.

Container 9 is provided with a removable cover 12, the height of which is such that it serves the function of providing an abutment for the plate 6, the upward travel of which is such that the float 11 will at all times be immersed, that is situated below the level 13 of the liquid contained in said container even when the balance is inoperative.

Container 9 is moreover provided, coaxially with its axis of revolution, with a conduit 14 allowing for the vertical displacement of the shaft 7, the friction of which against the walls of said conduit is negligible when the balance is correctly poised.

In a modification, shown in Figs. 2 and 3, the container 9 is replaced by a cylindrical tank 15 sealed at its lower end, float 16 is made rigid with the hook 17 for suspending the pan of the balance by means of pins 18 secured to a frame or armature 19 co-axial with the tank 15.

According to another modified embodiment of the invention as shown in Figs. 4 and 5, there are provided four floats 20 located in four independent tanks 21 and inter-connected by a rigid spider or cross-member 22, in the centre of which is arranged the hook 23 for suspending the balance pan.

In the latter case, the tanks 21 which contain a predetermined liquid are supported by a common table or a common tripod adapted for allowing the levelling of the whole assembly.

As in the previously described example, the connections between the floats 20 and the arms of the spider member 22 are provided by small pins 24 so as to reduce to a minimum the surface extending through the plane of the surface of the liquid contained in the related tanks in order to produce a considerable amount of penetration of the float for a small excess load on the pan of the balance, in other words, to increase the sensitiveness of the latter.

It should be noted that, according to the main feature of the invention, the centre of gravity of the movable structure of the device is in all cases situated below the centre of pressure, this making for a greater stability of the balance.

The movable structure should be as light as possible and the specific gravity of the liquid contained in the device very low, in order to increase the accuracy of the readings, when the balance according to this invention is used as a laboratory apparatus.

In the event of the balance being used for commercial purposes and therefore not calling for a high degree of precision, the container 9 may be made of glass, the float 1 of cork, the plate 6 and shaft 7 of light alloy, while the liquid contained in the tank 9 may be mercury in order to make it possible to carry out fairly large weighing operations and reducing the overall dimensions of the device (Fig. 1). The selection of a very highly mobile liquid further contributes to the accuracy of the readings.

The pins 4 may be tubular or not, made of glass, metal or any other material, and their length should be as small as possible for increasing their resistance to bending and buckling.

The graduations for the determination of the weight of an object are provided on a fixed portion of the balance, as for instance on the outer side wall of the container 9 as at 25 (Fig. 1), while the movable index 26 is integral with the lower end of the vertical shaft 7.

For high precision measurements, it is possible to determine the weight of a body by carrying out a double weighing process, as follows. The level reached by the float, when the pan contains a series of stamped weights, is carefully observed. Then the body, the weight of which is to be determined, is placed on the pan of the balance and stamped weights are removed from said pan until the float reaches the above observed level. The stamped weights removed during said second step represent the weight of the body. Care must be had to attain equilibrium when removing progressively the weights placed on the pan of the balance, always in the same manner, and for instance in the direction corresponding to the rise of the float and consequently of the movable index which is indirectly in fixed relation therewith.

It should be noted further, in the event of precision measurements, that it is possible to compensate for the variations in pressure due to differences in room temperature, by the expansion of the float, judiciously chosen with respect to the liquid in which it is sustained.

It is possible, besides, to amplify the expansions of the float and the liquid due to variations in temperature so as to use the device as a thermometer.

Furthermore the device according to this invention may constitute a hydrometer, and for that purpose it is simply necessary to introduce into the annular space of the container 9 for example (Fig. 1), the liquid the specific gravity of which it is desired to measure either directly or by comparing the specific gravities of two liquids.

The densimetric balance thus obtained offers the advantage, as compared to known devices of a similar type, the capacity of which is limited, of enabling the measurements of specific gravities lower than 1 and as high as 13.6 (specific gravity of mercury).

Finally, the float balance described above may be entirely constituted of non-metallic parts, thus making it possible to use it for the measurement of magnetic and electric forces.

The main advantages of the float balance as shown in the drawings are as follows:

Very high sensitiveness.

Faithfulness, the friction being negligible.

Automatic damping of the oscillations, by virtue of the design in itself.

Suppression of the conventional knife-edge fulcrum and consequently negligible wear.

Ruggedness.

Impossibility of mis-adjustment as compared to conventional balances in which it is simply necessary to remove abruptly a weight in order for the balance to become unsteady or "crazy."

The pan which receives the body to be weighed being located axially of the device, an impulse imparted to the pan in any direction does not distort the readings.

Large capacity, i. e. it is possible to weigh objects on an extensive range of weights (for example from 0.1 gr. to 2 kgs. and even higher).

The pan of the balance being aligned on a predetermined vertical axis, the device may be used for measuring any vertical force, i. e. it may replace to a certain extent a dynamometer, which is impossible with a conventional beam type balance.

Possibility of series production for large or small capacities (weighing machines or laboratory balances).

Simplicity of construction and therefore reduced cost of production.

Reduced overall dimensions, facilitating transport.

What I claim as my invention and wish to secure by Letters Patent is:

1. In a device for indicating a variable force, in combination, a container means, a body of liquid therein, cover means for said container particularly adapted for preventing any spilling of said liquid; a movable assembly including a light buoyant element in said container, a plurality of upwardly directed pins secured on the top of said light buoyant element, said pins being relatively short with respect to the height of said buoyant element, a common member interconnecting the upper portion of said pins and located in said container, and a rod secured at the center of said common member, downwardly directed and tightly passing through said container, the center of gravity of said movable assembly being below the resultant center of pressure while the weight of said movable assembly is so determined that the buoyant element can float on the liquid; abutment means for causing said cover to provide a limit for the upward displacements of said common member so that at rest the buoyant element remains immersed in the liquid; means for applying to said rod a force to be measured, and means for providing a reading of the vertical position of said buoyant element when such a force is applied, the surface level of the liquid and the shape of the container being so determined that the common member is always located above said surface level.

2. A balance comprising, in combination, a container means, a body of liquid therein, cover means for said container particularly adapted for preventing any spilling of said liquid; a movable assembly including a light buoyant element in said container, a plurality of upwardly directed pins secured on the top of said light buoyant element, said pins being relatively short with respect to the height of said buoyant element, a common member interconnecting the upper portion of said pins and located in said container, and a rod secured at the center of said common member, downwardly directed and tightly passing through said container, the center of gravity of said movable assembly being below the resultant center of pressure while the weight of said movable assembly is so determined that the buoyant element can float on the liquid; abutment means for causing said cover to provide a limit for the upward displacements of said common member so that at rest the buoyant element remains immersed in the liquid; a pan suspended at the lower end of said rod for receiving the object to be weighed, and means for providing a reading of the vertical position of said buoyant element when such an object is supported by said pan, whereby the weight of said object may be determined.

3. In a densimetric balance for measuring the relative specific gravity of liquids, the combination of a container means adapted to receive therein a body of the liquid the specific gravity of which is to be measured, cover means for said container particularly adapted for preventing any spilling of said liquid; a movable assembly including a light buoyant element in said container, a plurality of upwardly directed pins secured on the top of said light buoyant element, said pins being relatively short with respect to the height of said buoyant element, a common member interconnecting the upper portion of said pins and located in said container, and a rod secured at the center of said common member, downwardly directed and tightly passing through said container, the center of gravity of said movable assembly being below the resultant center of pressure while the weight of said movable assembly is so determined that the buoyant element can float on the liquid; abutment means for causing said cover to provide a limit for the upward displacements of said common member so that at rest the buoyant element remains immersed in the liquid; a pan suspended at the lower end of said rod for receiving standard weights largely exceeding the stress exerted by said light buoyant element against said abutment means when unloaded, and means for providing a reading of the level attained by said assembly when said weights are used, whereby the relative specific gravity to be measured may be obtained from the difference existing between said level and the level attained by said assembly when the same standard weights are supported by the pan in presence of a standard liquid.

4. A balance comprising, in combination, an annular container having a bottom wall, an outer cylindrical wall and an inner coaxial cylindrical wall defining an annular volume limited by said bottom wall, the height of the outer cylindrical wall being greater than that of the inner cylindrical wall, a body of liquid in said annular volume; a movable assembly including a hollow annular light buoyant element surrounding said inner cylindrical wall and the height of which is less than that of said inner cylindrical wall, a plurality of upwardly directed elongated pins secured on the top of said buoyant element, said pins having a height less than that of said buoyant element and a cross-section largely shorter than that of said buoyant element, a common member interconnecting the upper portion of said pins and located in said container, a rod secured at the center of said common member and passing through the cylindrical space defined by said inner cylindrical wall, and a pan suspended at the lower end of said rod for receiving the object to be weighed, the center of gravity of said movable assembly being below the resultant center of pressure while the weight of said movable assembly is so determined that the buoyant element can float on the liquid; a cover engaging said outer cylindrical wall for preventing any spilling of liquid and formed with a downwardly directed abutment for limiting the upward displacements of said movable assembly so that at rest the buoyant element remains immersed in the liquid; and indicating means for providing a reading of the vertical position of said buoyant element.

OUAIDA, SADALLAH.

REFERENCES CITED

The following references are of record in the file of this patent:

UNITED STATES PATENTS

| Number | Name | Date |
|---|---|---|
| 1,199,687 | Gephardt | Sept. 26, 1916 |

FOREIGN PATENTS

| Number | Country | Date |
|---|---|---|
| 74,648 | Switzerland | Apr. 2, 1917 |